(12) United States Patent
Holmes et al.

(10) Patent No.: US 6,897,777 B2
(45) Date of Patent: May 24, 2005

(54) NON-LINEAR JUNCTION DETECTOR (75) Inventors: Steven John Holmes, Leicestershire (GB); Andrew Barry Stephen, Northampton (GB)

(73) Assignee: Audiotel International Limited, Weldon (GB)

(*) Notice: Subject to any disclaimer, the term of this patent is extended or adjusted under 35 U.S.C. 154(b) by 0 days.

(21) Appl. No.: 10/467,507

(22) PCT Filed: Feb. 11, 2002

(86) PCT No.: PCT/GB02/00556

§ 371 (c)(1),
(2), (4) Date: Dec. 15, 2003

(87) PCT Pub. No.: WO02/065419

PCT Pub. Date: Aug. 22, 2002

(65) Prior Publication Data

US 2004/0095243 A1 May 20, 2004

(30) Foreign Application Priority Data

Feb. 13, 2001 (GB) .............................. 0103429

(51) Int. Cl.⁷ .............................................. G08B 13/14
(52) U.S. Cl. ................................ 340/572.2; 340/572.4; 340/551
(58) Field of Search .......................... 340/572.1, 572.2, 340/572.4, 572.7, 551, 568.1, 10.1, 693.1, 693.6; 342/21, 28, 46, 193

(56) References Cited

U.S. PATENT DOCUMENTS

| 5,191,343 A | * | 3/1993 | Danzer et al. ................. 342/21 |
| 6,057,765 A | * | 5/2000 | Jones et al. .............. 340/572.2 |
| 6,163,259 A | * | 12/2000 | Barsumian et al. ...... 340/572.2 |

FOREIGN PATENT DOCUMENTS

| CA | 1038039 | * | 9/1978 |
| EP | 0 611 164 A1 | | 8/1994 |
| EP | 0 798 681 A1 | | 10/1997 |
| GB | 1 527 399 | | 10/1998 |

* cited by examiner

*Primary Examiner*—Van T. Trieu
(74) *Attorney, Agent, or Firm*—Bromberg & Sunstein LLP (57) ABSTRACT

A target junction is illuminated with energy at a fundamental RF frequency and reflections from the non-linear junction are analyzed to determine the type of junction detected. The power output level of a transmitter emitting the illuminating signal is automatically controlled so as to drive the signal strength of the received signals towards a predetermined value, e.g. a minimum threshold value. An indication of the current received signal strength, adjusted by a factor so as to compensate for any automatic adaptation in the actual transmitter power output level, may be provided to an operator.

18 Claims, 11 Drawing Sheets

Set ADC to read 2$^{nd}$ Harmonic RSSI

NewPDif = RSSI − MAX_INPUT_RSSI
IF NewPDiff > 0 THEN
    /* Must back off Output power */
    IF NewPDiff > MaxStep THEN
        NewPDif = OldPDif + MaxStep
    ELSE
        NewPDif = OldPdif + NewPDif
    ENDIF
ELSE
    /* may need to re-apply the output power */
    NewPDif = Max_INPUT_RSSI − RSSI
    IF (NewPDif > MaxStep) THEN
        NewPDif = OldPDif − MaxStep
    ELSE
        NewPdif = OldPDif − NewPDif
    ENDIF
    IF (NewPDif < 0) THEN
        /* full power restored, don't re-apply more */
    ENDIF
Endif Indicated_RSSI = RSSI + OldDif + NUDGE
End Function MEASURE RSSI  - Measure 2$^{nd}$ Harmonic

Function Calculate Output Power
/* Calculate Output Power TXPOTN in Auto mode, which monitors the second harmonic, and will back off the output power automatically when RSSI approaches the "MAX_INPUT_RSSI" value. The $2^{nd}$ and third harmonic indicated RSSI signals are increased in proportion with the decrease in TXPOTN power. The range of adjustment for TXPOTN is set between; MINPOWER and MAXPOWER.
Where the TXPOTN required to be reduced below MINPOWER, then a NUDGE value is calculated to increase the indicated RSSI to the operator.
*/

```
        TXPOTN = MAX_VAL
        NUDGE = 0
        TXPOTN = TXPOTN - NEWPDIF
        IF TXPOTN < MINPOWER THEN
              OldPDif = NewPDif
              NewPDif = TXPOTN - MINPOWER
              TXPOTN = MINPOWER
              NUDGE = (OldPowerDif - NewPDif) * 4
        ENDIF
        Output power to Head
End Function Calculate Output Power
```

NON-LINEAR JUNCTION DETECTOR

CROSS-REFERENCE TO RELATED APPLICATIONS

This application is a 371 of PCT/GB02/00556 filed on Feb. 11, 2002, which claims priority from United Kingdom patent application number 0103429.7 filed on Feb. 13, 2001.

FIELD OF THE INVENTION

The present invention relates to methods and apparatus for detecting the presence of non-linear junctions.

BACKGROUND OF THE INVENTION

A non-linear junction detector (hereinafter "NLJD") is a device which can be used to detect junctions between two materials exhibiting dissimilar electronic or electrical properties. Examples of non-linear junctions are semiconductor junctions or junctions between dissimilar metals. Such detectors are widely used in counter surveillance operations and in electronic ordnance detection.

Figure 1:
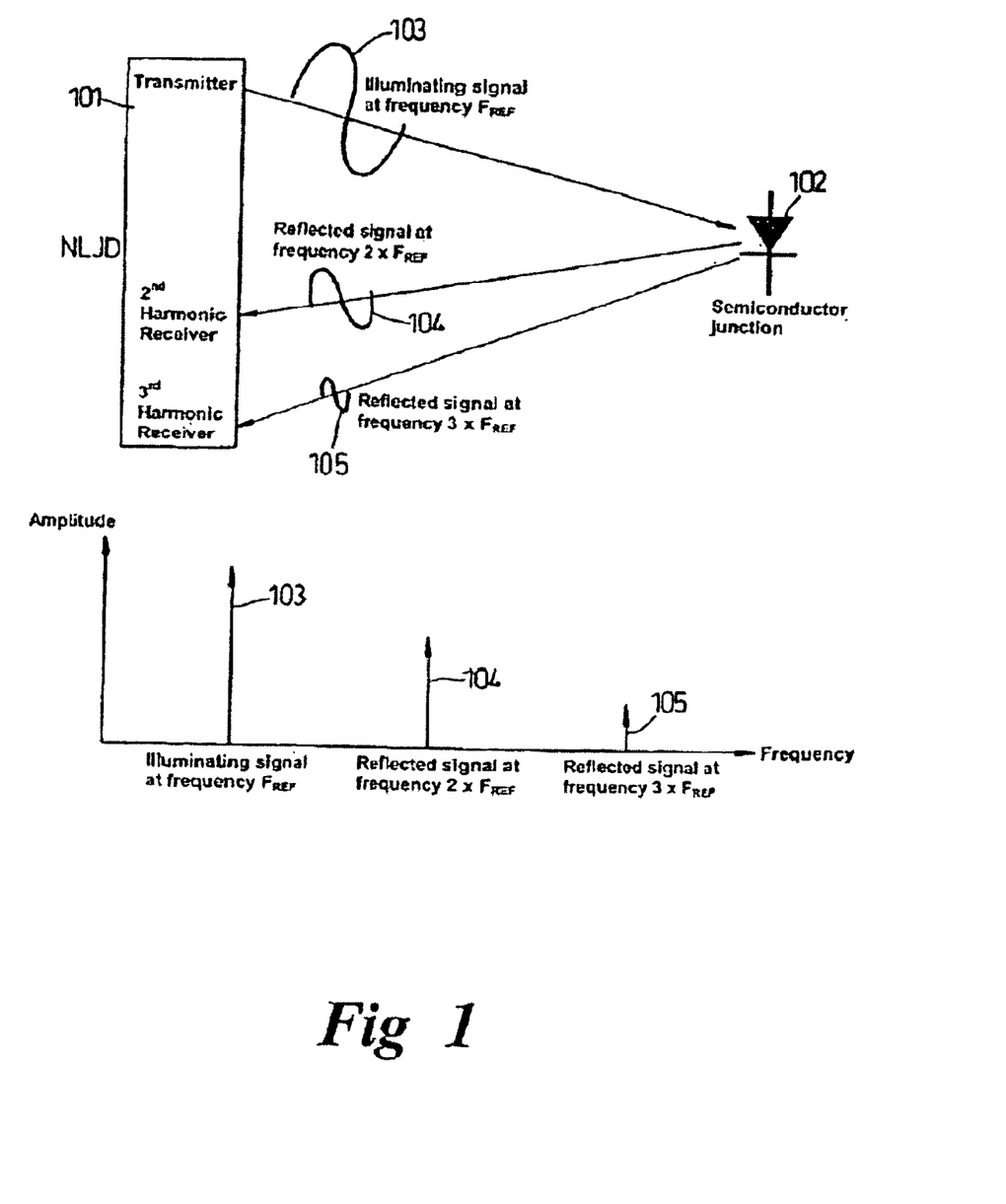
FIG. 1 is a schematic diagram illustrating the principles of non-linear junction detection for a semiconductor junction.
Figure 2:
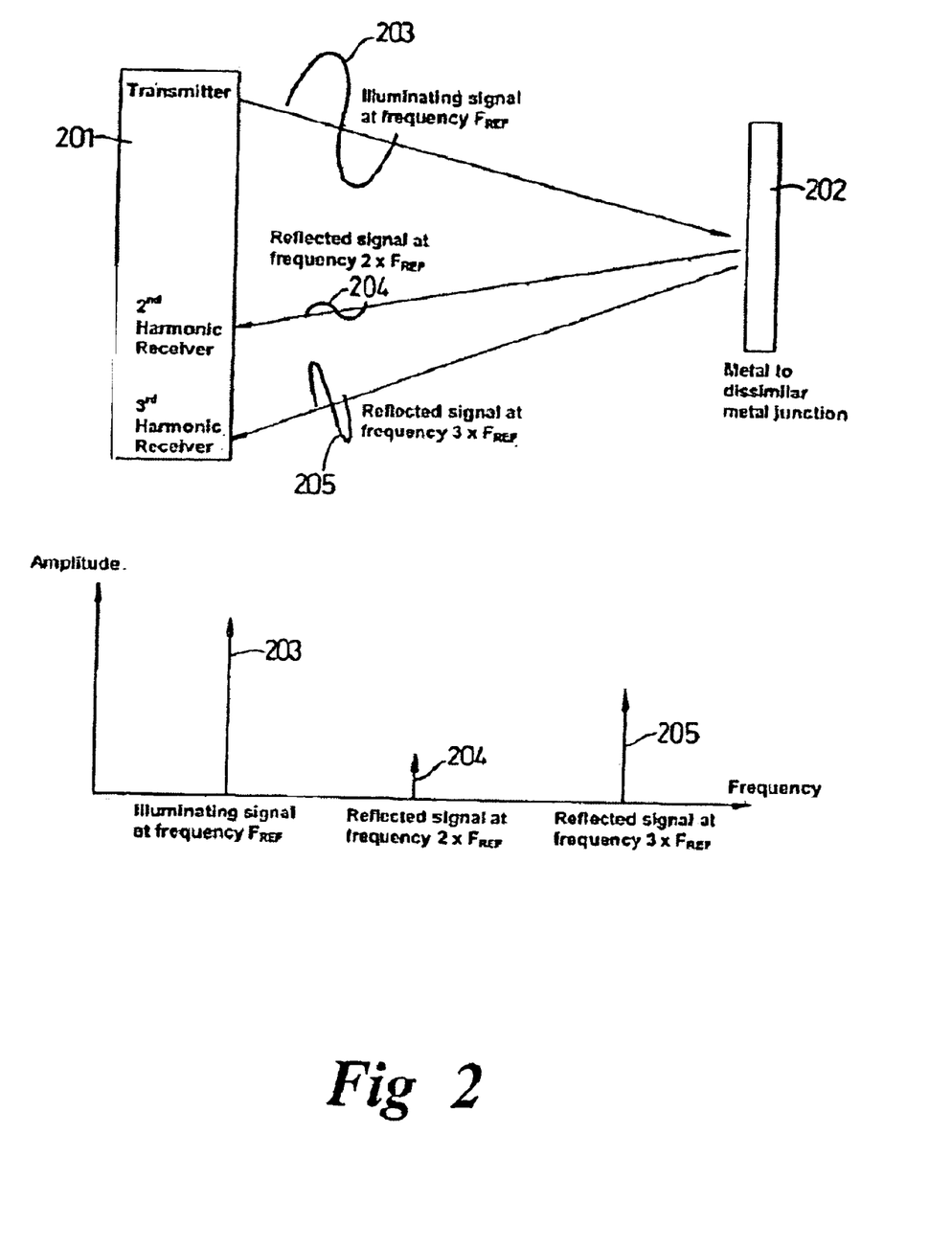
FIG. 2 is a schematic diagram illustrating the principles of non-linear junction detection for a junction between dissimilar metals.

An exemplary operation of a prior art NLJD is illustrated in FIGS. 1 and 2.

The NLJD 101 operates by illuminating a target junction 102 with energy 103 at a fundamental RF frequency. Reflections 104, 105 from the non-linear junction 102 can then be analysed to determine the type of junction detected. The reflections from the non-linear junction usually have principal frequency components at twice and three times the illuminating signal frequency (2nd and 3rd harmonics).

In general, a semiconductor junction 102 will return predominantly second harmonics 104. Junctions between dissimilar metals 202 will return higher levels of third harmonic 205 or very similar levels of second and third harmonics 204, 205, but predominantly third harmonics.

In prior art systems, the power level of the transmitted illuminating signal has been manually determined by the operator. In general (maintaining all other NLJD system parameters constant) the detection range of the NLJD system 101, 201 can be altered by varying the level of the illuminating signal 103, 203.

In order to achieve maximum detection range the illuminating signal level 103, 203 must also be set to a maximum.

Consider a target junction 102, 202 with a fundamental to 2nd harmonic conversion loss of $L_R$;

$$L_R = P_i - P_o \quad (1)$$

Where $P_i$ is the illumination level at the target junction and $P_o$ is the reflected level at the 2nd harmonic.

∴

$$L_R = P_{TJR} - (2P_{TJR} - k) \quad (2)$$

∴

$$L_R = k - P_{TJR} \quad (3)$$

where k is a conversion constant; $P_{TJR}$ is the fundamental illuminating power level at the target junction and the factor of 2 assumes that the target junction conversion loss is a 2nd order function.

Figure 3:
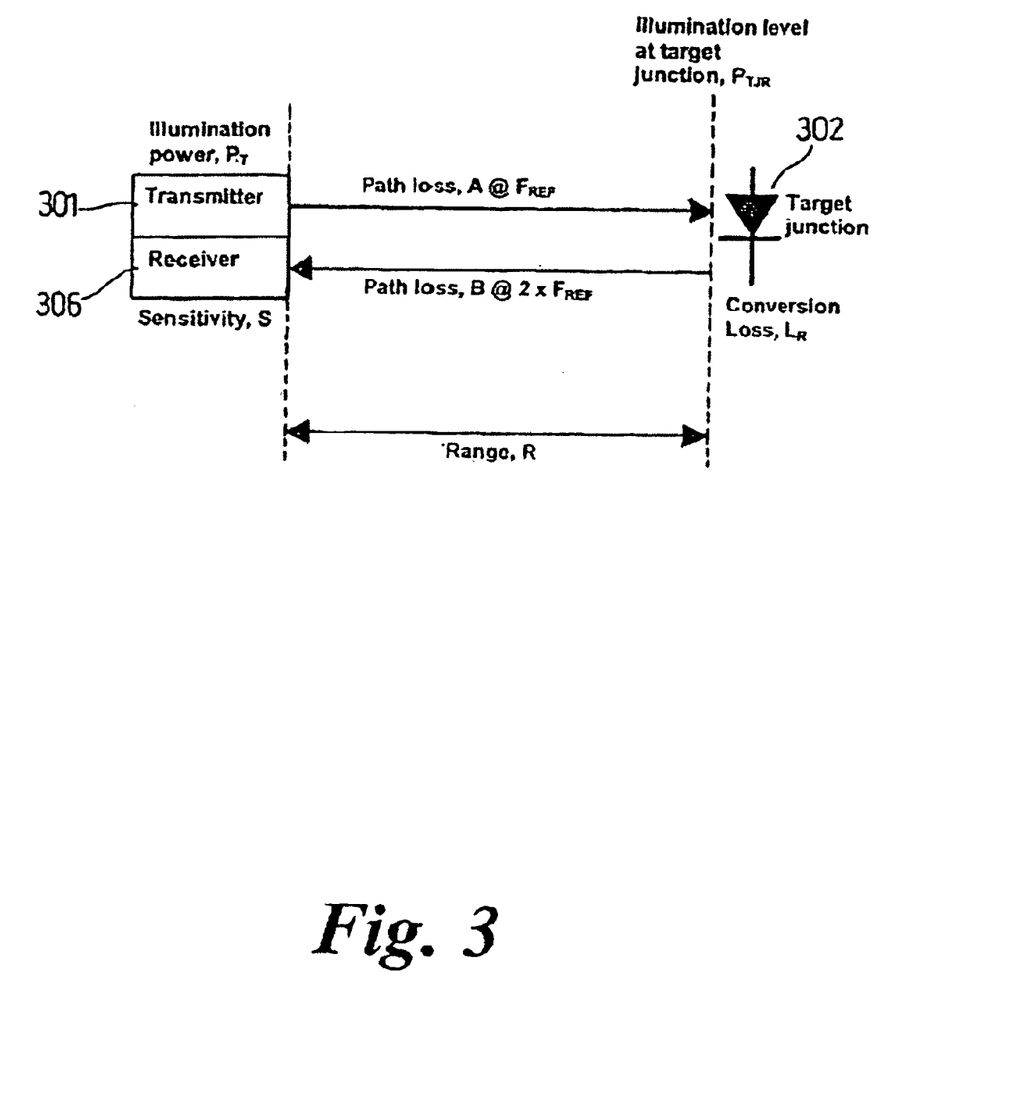
FIG. 3 is a schematic diagram illustrating losses occurring in non-linear junction detection systems.

With reference to FIG. 3, assume that the target junction 302 is illuminated by a NLJD 301, also assume that the NLJD has a 2nd harmonic receiver 306 with detection sensitivity, S, and that the range between the target junction and the NLJD is R (km), see FIG. 3.

In order for the target junction 302 to be detected in free space the NLJD 301 must illuminate the junction with a power of $P_T$, $$P_T = S + B + L_R + A \quad (4)$$

where A is the free space path loss between the NLJD transmitter and the target junction at the fundamental frequency, $F_{REF}$(MHz), $$A = 32.4 + 20\log_{10}(F_{REF}) + 20\log_{10}(R) \quad (5)$$

and B is the free space path loss between the target junction and the NLJD 2nd harmonic receiver at the 2nd harmonic frequency, $$B = 32.4 + 20\log_{10}(2 \times F_{REF}) + 20\log_{10}(R) = A + 6 \quad (6)$$

Using equations (3) and (6), the expression for $P_T$ (4) can be re-written as:

$$P_T = S + (A+6) + (k - P_{TJR}) + A \quad (7)$$

The illuminating power level at the target junction can be expressed as:

$$P_{TJR} = P_T - A \quad (8)$$

Substituting (8) into (7) gives the illumination level at the NLJD as:

$$P_T = S + (A+6) + (k - [P_T - A]) + A \quad (9)$$

∴ (10)

$$P_T = \frac{S + 3A + k + 6}{2}$$

Substituting (10) back into (8) gives the illumination level at the target as:

$$P_{TJR} = \frac{S + A + k + 6}{2} \quad (11)$$

As a target junction 302 is approached by the detector 301, the level of the illuminating signal at the junction will also increase.

Consider now that the range between the target junction and the NLJD is reduced by a factor of 2 from R to R/2.

The level of the illuminating signal at the target junction, $P_{TJR/2}$ will now increase to:

$$P_{TJR/2} = P_T - (A - 6) \quad (12)$$

∴ (13)

$$P_{TJR/2} = \frac{S + A + k + 18}{2}$$

Therefore decreasing the range by a factor of 2 increases the illumination level at the target by:

$$\Delta P_{TJ} = P_{TJR/2} - P_{TJR} = 6 \text{ dB} \quad (14)$$

In general, the increase in illumination level at the target junction results in an increase in the received harmonic reflection level.

Increasing the level at the target junction by $\Delta P_{TJ}$ will decrease the junction conversion loss by a factor $\Delta P_{TJ}$ (assuming that the target junction conversion loss is a second order function).

Therefore the target junction conversion loss will reduce to:

$$L_{R/2} = L_R - (\Delta P_{TJ}) \quad (15)$$

Therefore the reflected 2nd harmonic level at the NLJD receiver, $P_R$, will increase to:

$$P_R = P_{TJR/2} - L_{R/2} - A \quad (16)$$

∴

$$P_R = P_{TJR/2} - [k - P_{TJR/2}] - A \quad (17)$$

∴

$$P_R = S + 18 \quad (18)$$

i.e. by reducing the range, R, by a factor of 2 the level at the NLJD 2nd harmonic receiver increases by 18 dB.

The increase in harmonic level can subsequently be used to indicate to the operator that the target junction is being approached.

Figure 4:
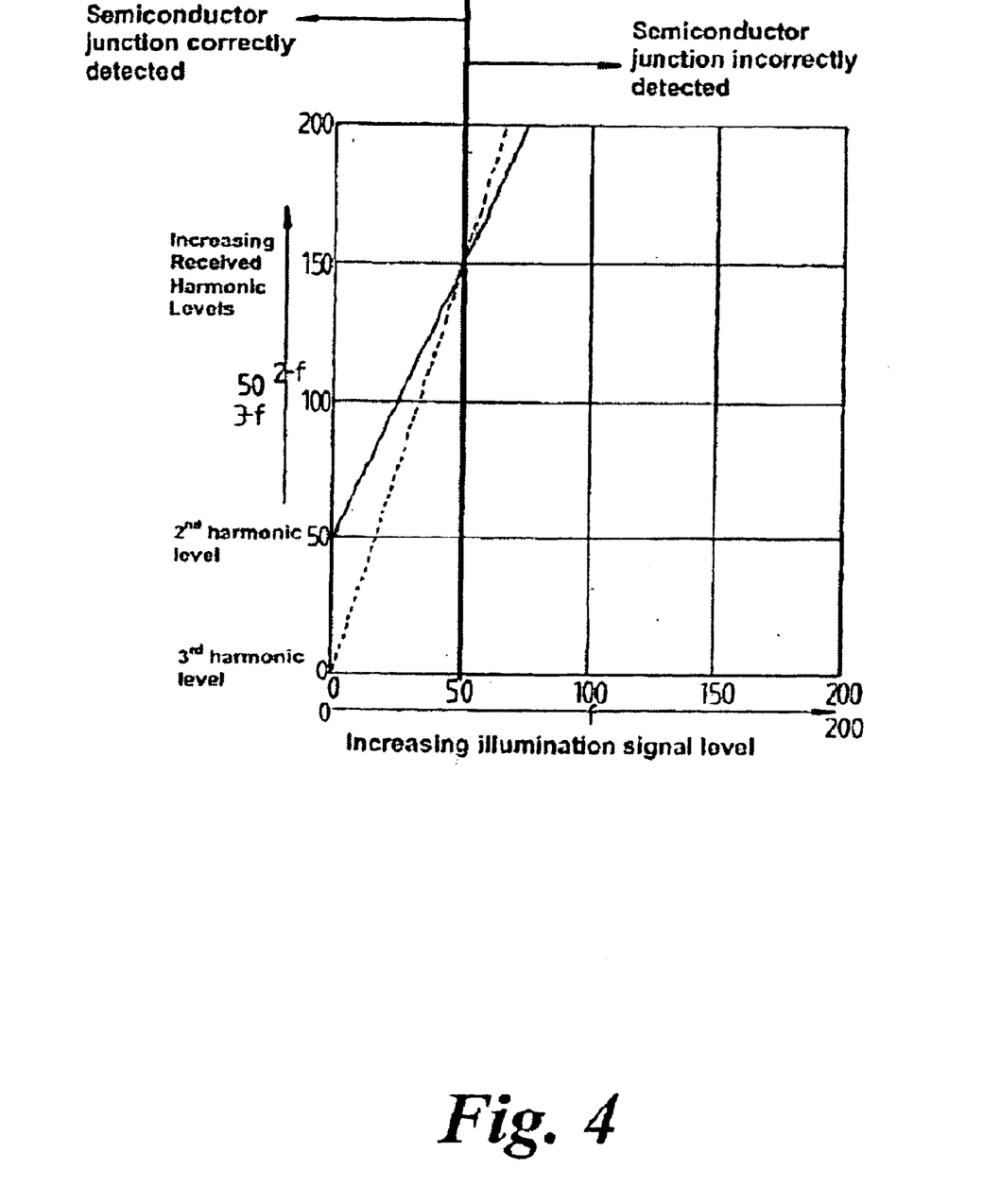
FIG. 4 is a graph illustrating increasing power levels of reflected signal as a function of illumination signal and harmonic order.

Whilst the operating mechanism described previously is perfectly adequate for detecting the vast majority of non-linear junctions, increasing the illumination level at the target can have a number of undesirable effects.

a) The illumination level can increase to such an extent that the target junction becomes saturated and false indications can occur (e.g. semiconductor junctions can be indicated as metal to dissimilar metal junctions).
   Note: The 3rd harmonic response will increase at a rate proportional to 3 times the increase in illuminating signal level, whereas the 2nd harmonic response will increase at a rate proportional to 2 times the increase in illuminating signal level. This is illustrated in FIG. 4.

b) System power (e.g. battery life) is wasted by allowing the level of the illuminating signal to increase beyond the point at which detection occurs.

c) In certain applications e.g. improvised explosive device detection (IED) or explosive ordnance disposal (EOD), an increase in illuminating signal at the target junction can lead to unwanted device triggering.

d) Interference to office equipment may occur which can alert others to the fact that an NLJD is in use.

e) Higher illumination levels increase the risk of interference to a casual observer.

SUMMARY OF THE INVENTION

Embodiments of the present invention may provide a method and apparatus for the detection of non-linear junctions that reduces, or avoids increase in, the illumination level of the target junction as the target is being approached.

Embodiments of the present invention may also eliminate, reduce or minimise undesirable effects in non-linear junction detection such as those mentioned in the background section above.

In one aspect, the present invention provides a detector that adapts the illuminating signal level in order to maintain a substantially constant received signal strength indication (RSSI) from the NLJD harmonic receiver.

According to another aspect, the present invention provides a non-linear junction detector comprising:
   a transmitter for emitting an illuminating signal at a power output level;
   a receiver for receiving reflected signals;
   means for determining a signal strength of said received signals; and
   control means for automatically varying the power output level of the transmitter so as to drive the signal strength of said received signals towards a predetermined value.

Preferably, the invention is implemented as an adaptive software control algorithm controlling detector hardware.

According to another aspect, the present invention provides a method of detecting non-linear junctions, comprising the steps of:
   transmitting an illuminating signal at a first power output level;
   receiving reflected signals from a non-linear junction;
   determining a signal strength of a selected component of said received signals; and
   automatically varying the first power output level to a second power output level so as to drive the signal strength of said selected component towards a predetermined value.

According to another aspect, the present invention provides a non-linear junction detector comprising:
   a transmitter for emitting an illuminating signal at a power output level;
   a receiver for receiving reflected signals;
   means for determining a signal strength of said received signals;
   control means for varying the power output level of the transmitter; and
   feedback means, coupled to said control means and said signal strength determining means, adapted to use the determined signal strength of said received signals as a control parameter for said transmitter control means.

BRIEF DESCRIPTION OF THE DRAWINGS

Embodiments of the present invention will now be described by way of example and with reference to the accompanying drawings in which.

DETAILED DESCRIPTION OF A PREFERRED EMBODIMENT

Consider that the illumination level required to detect a target junction at range, R, is as given in equation (1).

Also assume that the range, R, is then reduced by a factor of 2 to R/2, for example when the detector is being moved towards a junction being detected.

With the software algorithm of the present invention in operation, the illuminating power level will be varied such that the 2nd harmonic level at the NLJD receiver 306 will be driven to a value of S.

This occurs when the illuminating signal level at the NLJD transmitter, $P_{TSWR/2}$, is:

$$P_{TSWR/2} = S + A + L_R + (A+6) \qquad (19)$$

Substituting the value for the target conversion loss, $L_R$ (3), gives:

$$P_{TSWR/2} = S + A + (k - P_{TJSWR/2}) + (A-6) \qquad (20)$$

The illuminating signal level at the target junction, $P_{TJSWR/2}$, can be expressed as:

$$P_{TJSWR/2} = P_{TSWR/2} - (A-6) \qquad (21)$$

Substituting (21) into (20) gives:

$$P_{TSWR/2} = S + A + (k - [P_{TSWR/2} - (A-6)]) + (A-6) \qquad (22)$$

$$\therefore \qquad (23)$$

$$P_{TSWR/2} = \frac{S + 3A + k - 12}{2}$$

Substituting (23) back into (21) gives the illumination level at the target junction as:

$$P_{TJSWR/2} = \frac{S + A + k}{2} \qquad (24)$$

Comparing (24) & (13) shows that when the software algorithm maintains S at a constant value a reduction in illumination level at the target junction of:

$$P_{TJR/2} - P_{TJSWR/2} = 9 \text{ dB (relative to no illuminating power reduction)} \qquad (25)$$

can be expected for every reduction in range, R, by a factor of 2.

The reduction given by (25) can also be expected in the illuminating signal level at the NLJD transmitter, $P_{TSWR/2}$, when the software algorithm is in operation.

Figure 5:
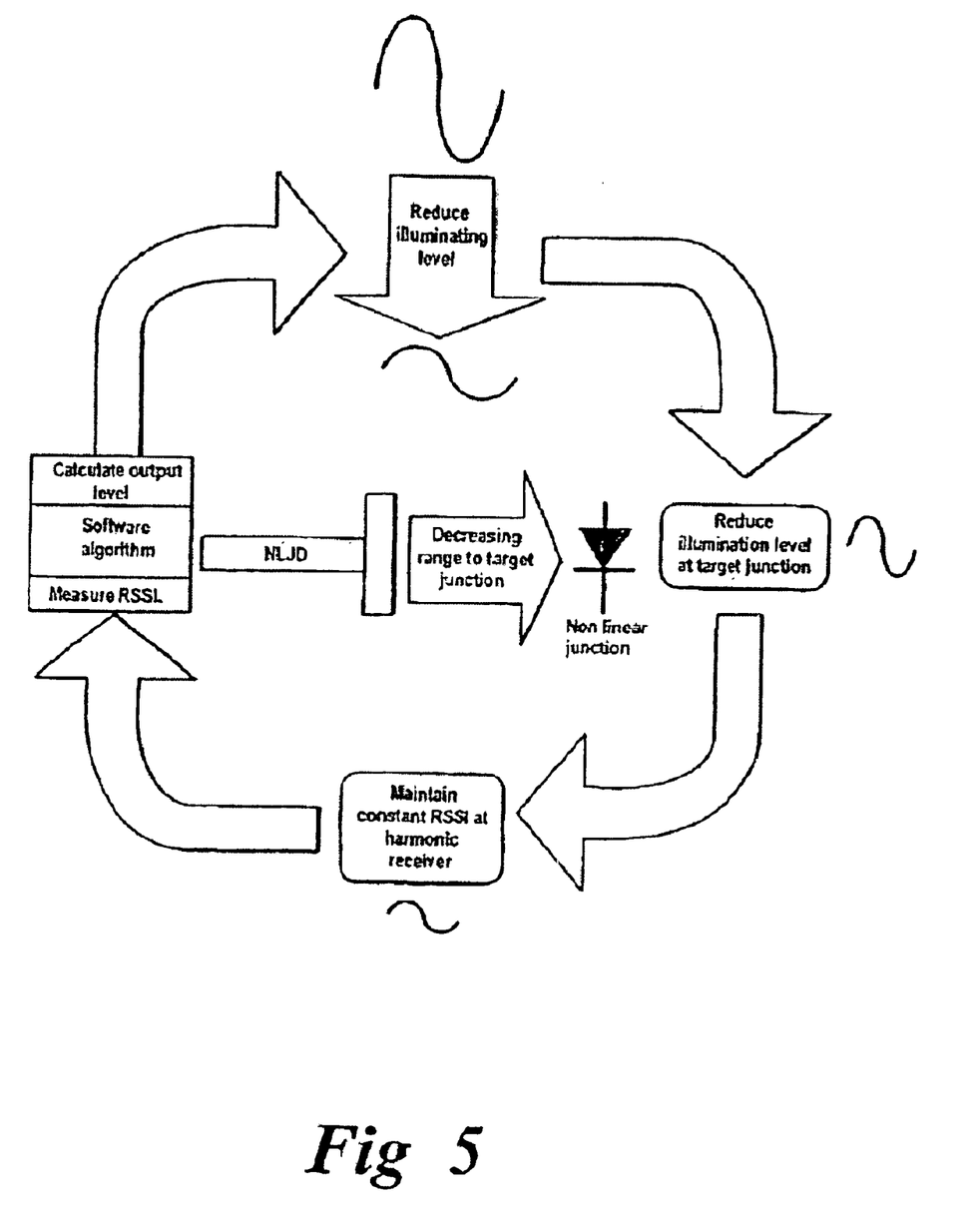
FIG. 5 is a schematic flow diagram of the operation of a software control algorithm according to one embodiment of the present invention.

A block diagram showing how the software algorithm interfaces with the NLJD system is shown in FIG. 5. The preferred objective is to maintain a constant RSSI at the harmonic receiver.

The preferred software algorithm is constructed using two main functions: MEASURE RSSI and CALCULATE OUTPUT POWER.

Figure 6:
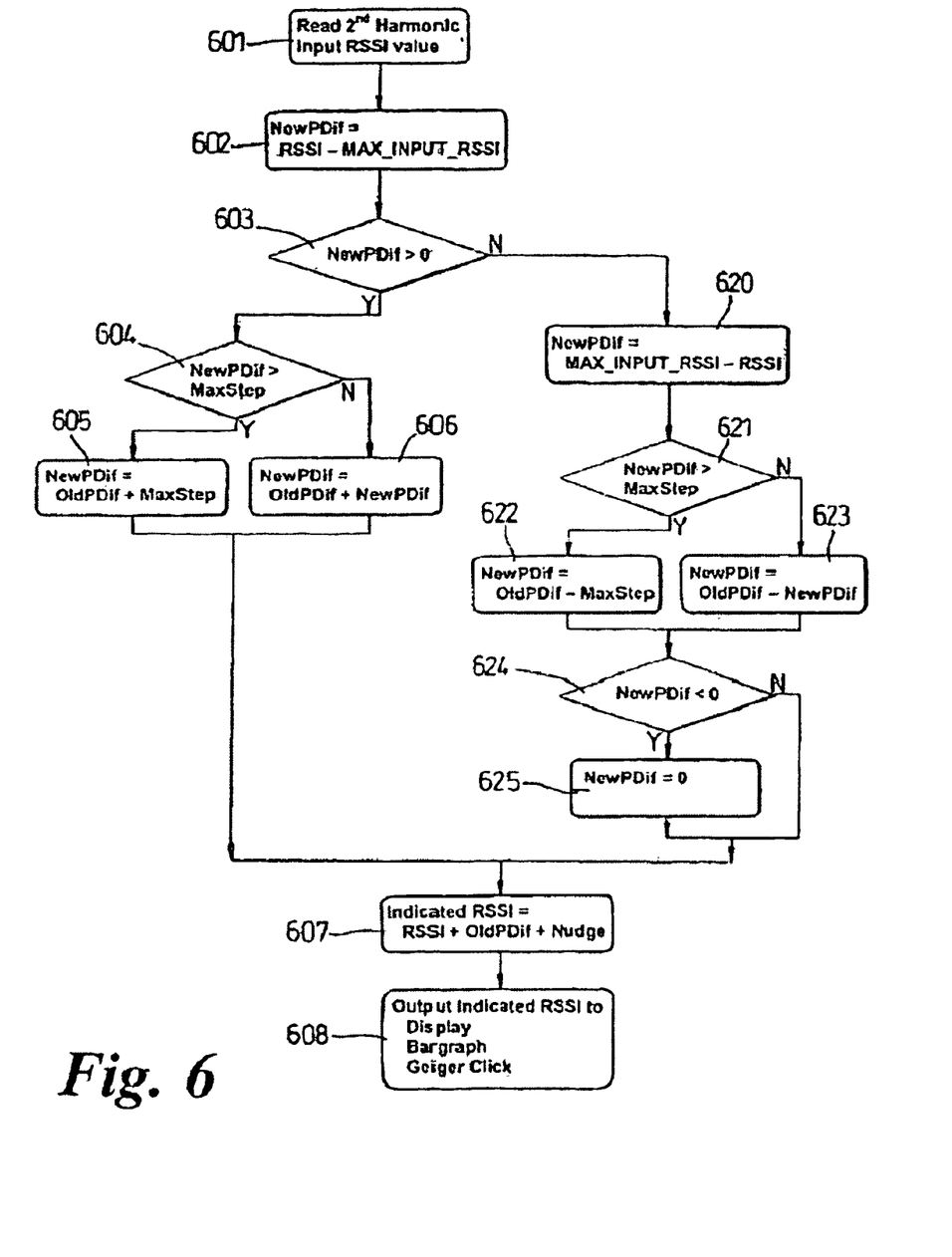
FIG. 6 is a flowchart illustrating an exemplary process flow for deriving a received signal strength indicator value.
Figure 7:
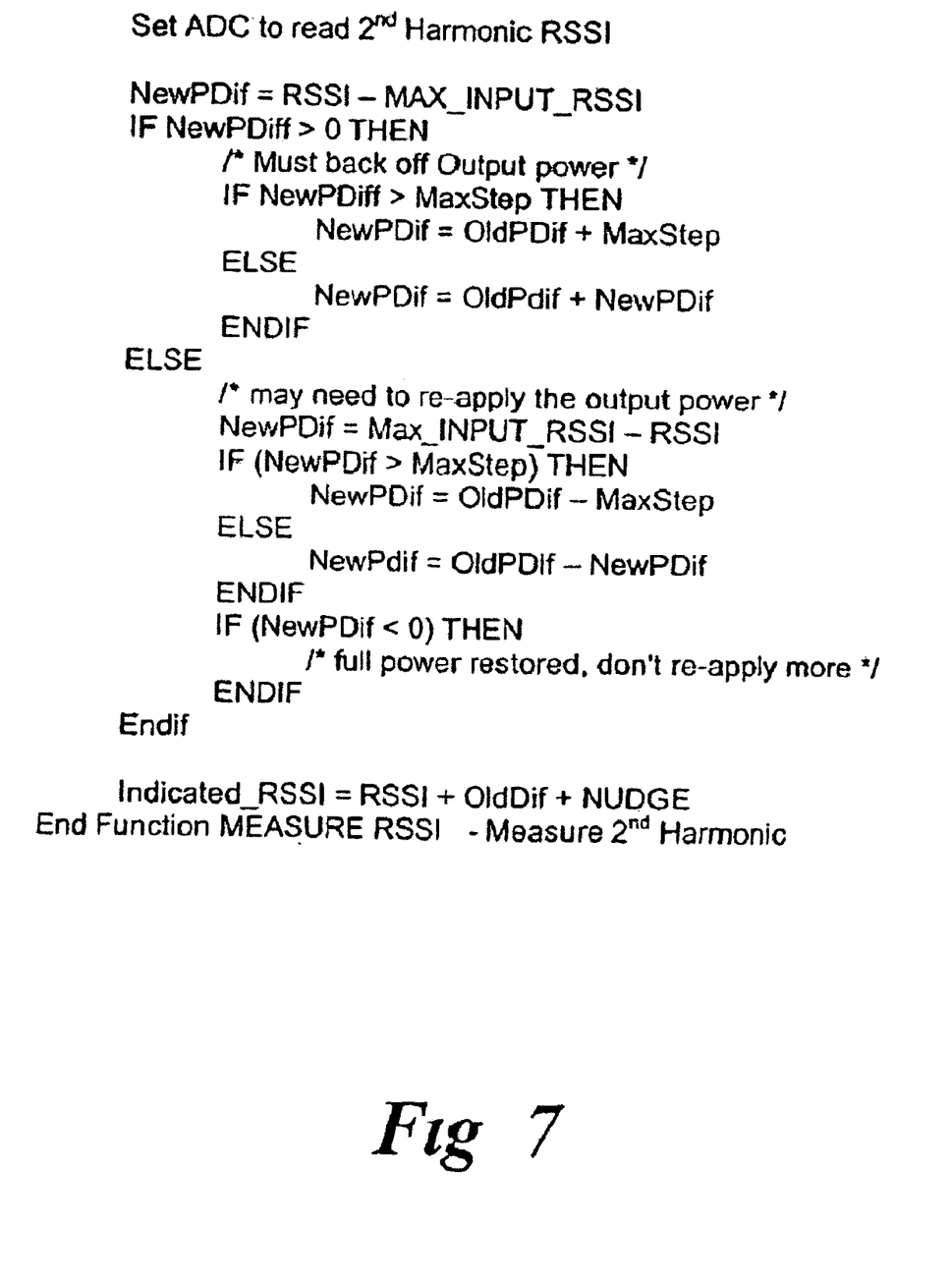
FIG. 7 is a portion of program code for implementing the process flow of FIG. 6.

A flow chart for the function MEASURE RSSI is shown in FIG. 6 and a coded implementation of the function is shown in FIG. 7.

Figure 8:
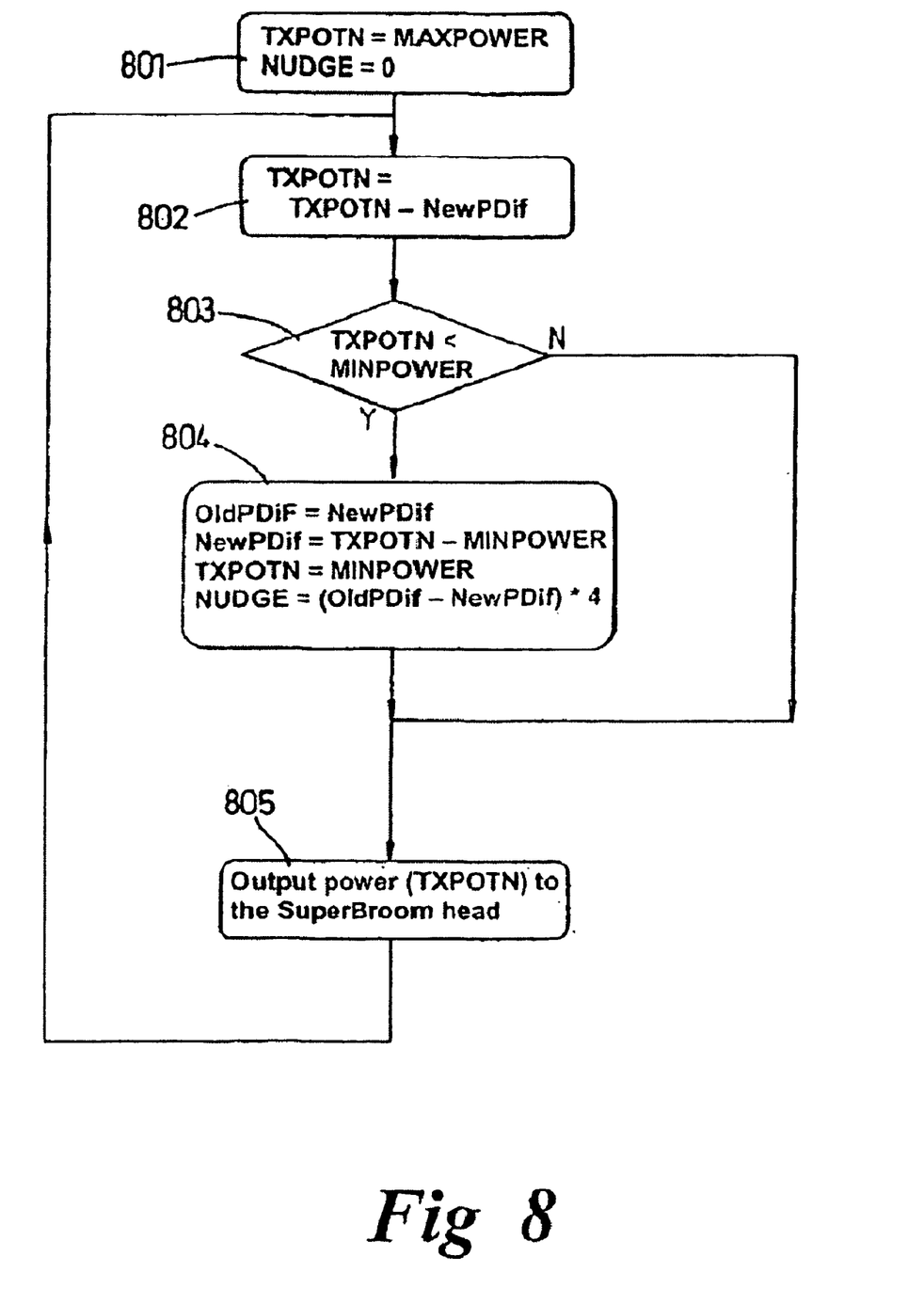
FIG. 8 is a flowchart illustrating an exemplary process flow for calculating output power to be used based on a received signal strength indicator.
Figure 9:
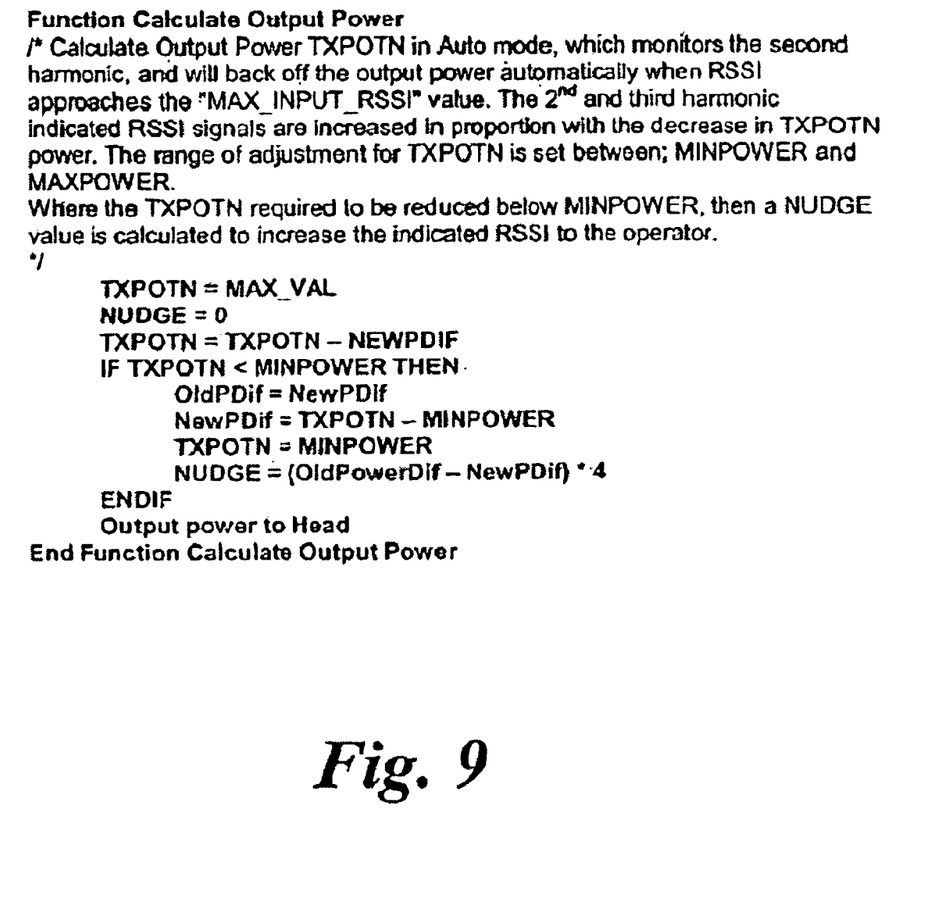
FIG. 9 is a portion of program code for implementing the process flow of FIG. 8.

A flow chart for the function CALCULATE OUTPUT POWER is shown in FIG. 8 and a coded implementation of the function is shown in FIG. 9.

There follows a detailed description of how the algorithm operates.

For reference, the software uses the following variables to define the algorithm control parameters:

MAXPOWER: The maximum allowable illuminating signal level.

MINPOWER: The minimum allowable illuminating signal level.

MAX_INPUT_RSSI: The RSSI level which the algorithm attempts to maintain, equivalent to S in the previous calculations.

MAXSTEP: The maximum allowable illuminating signal variation per iteration of the algorithm. The value chosen for MAXSTEP effectively alters the rate at which the detector can adapt to track changes in the RSSI. A large value for MAXSTEP provides a fast tracking algorithm, while a small value for MAXSTEP provides a slow tracking algorithm.

TXPOTN: Used to set the output level of the illuminating signal, equivalent to $P_T$ and $P_{TSWR/2}$ in the previous calculations.

NEWPDIF: Variable used to adjust the illuminating signal level.

OLDPDIF: The NEWDIF value from the previous iteration of the software, used to calculate the RSSI indicated to the operator.

NUDGE: Used to increase the RSSI indicated to the user when the illuminating signal cannot be further reduced, i.e. TXPOTN=MINPOWER.

Case 1: NLJD Approaching a Target Junction

With reference to FIG. 6, the following description of the algorithm operation relates to the NLJD moving toward a target non-linear junction At step 601, the system reads the current 2nd harmonic RSSI value and in step 602 determines a difference value, NEWPDIF between the current RSSI value and the maximum (target) allowed RSSI value. When the RSSI from the 2nd harmonic receiver rises above the MAX_INPUT_RSSI level (ie. NEWPDIF>0, step 603) the software algorithm will decrease the illuminating signal level, via the TXPOTN variable discussed later, to drive the RSSI back to the MAX_INPUT_RSSI level.

The amount of decrease in the illuminating signal level, NEWPDIF, is determined by checking to see whether the value NEWPDIF exceeds a maximum allowed step size or not (step 604). If yes, the algorithm calculates NEWPDIF to be OLDPDIF+MAXSTEP (step 605) and if no, OLDPDIF+NEWPDIF (step 606).

The illuminating signal level can be decreased until the MINPOWER level is reached as will be described later.

The calculated value for NEWPDIF is then used to determine the power level of the illuminating signal, which is fed into the CALCULATE OUTPUT POWER algorithm of FIG. 8. As the illuminating signal level reduces, the amount of decrease, OLDPDIF, is added to the RSSI indication (step 607).

This indicates to the operator that the NLJD is approaching a target junction. In existing detectors, the operator of the NLJD is able to see that a junction is being approached by virtue of the increasing RSSI. In the present invention, the RSSI is preferably being maintained at a predetermined constant level, being maintained between predetermined levels or being driven towards a particular value. Thus, the RSSI value no longer serves as an indication of proximity of the target junction.

In the preferred embodiment, OLDPDIF is an offset proportional to the amount that the algorithm has had to decrease the illuminating signal when approaching a target to maintain or achieve the desired RSSI value. OLDPDIF is therefore added to the value of MAX_INPUT_RSSI (step 607) to indicate the proximity of the target junction to the user (step 608).

When the target junction is very close to the illuminating source, the situation may arise where the illuminating source power may not be reduced any further. This occurs when the transmit power, TXPOTN=MINPOWER is reached. The NUDGE factor is used to compensate for the fact that the indication to the user of the proximity of the detected junction would otherwise, at this point, reach a maximum. The NUDGE factor serves to increase the dynamic range of the system when very close to a target junction. Thus, when TXPOTN=MINPOWER, the NUDGE factor will be added to the displayed RSSI value in order to indicate the proximity of the target junction (steps 607, 608).

Figure 10A:
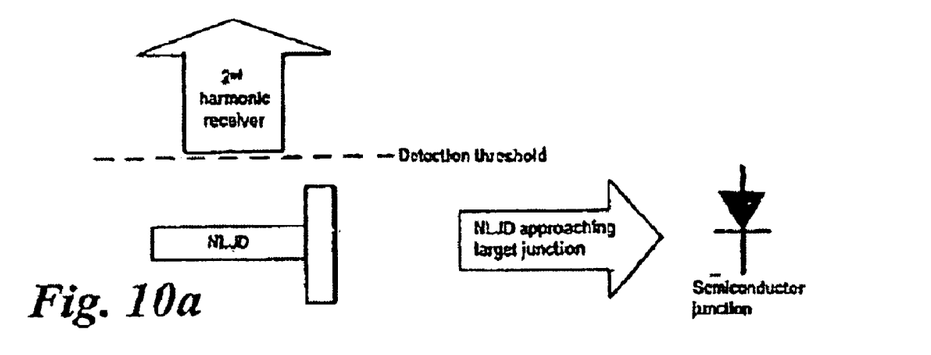
FIGS. 10a, 10b and 10c are schematic diagrams illustrating the principle of the invention for the case where a detector is moving towards a target junction.
Figure 10B:
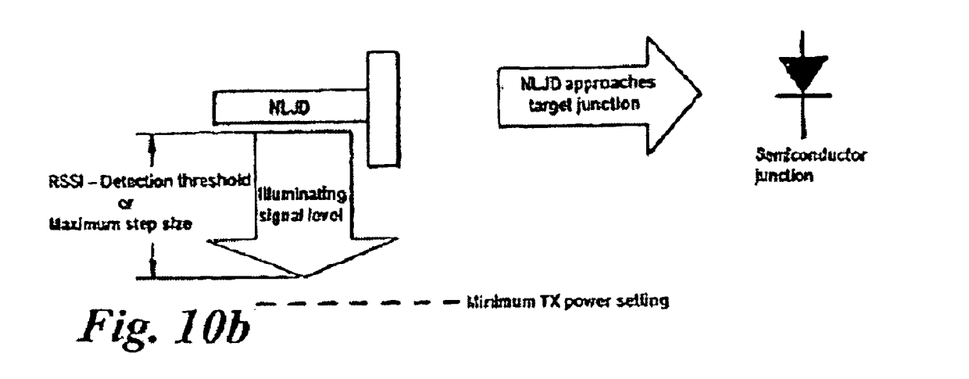
Figure 10C:
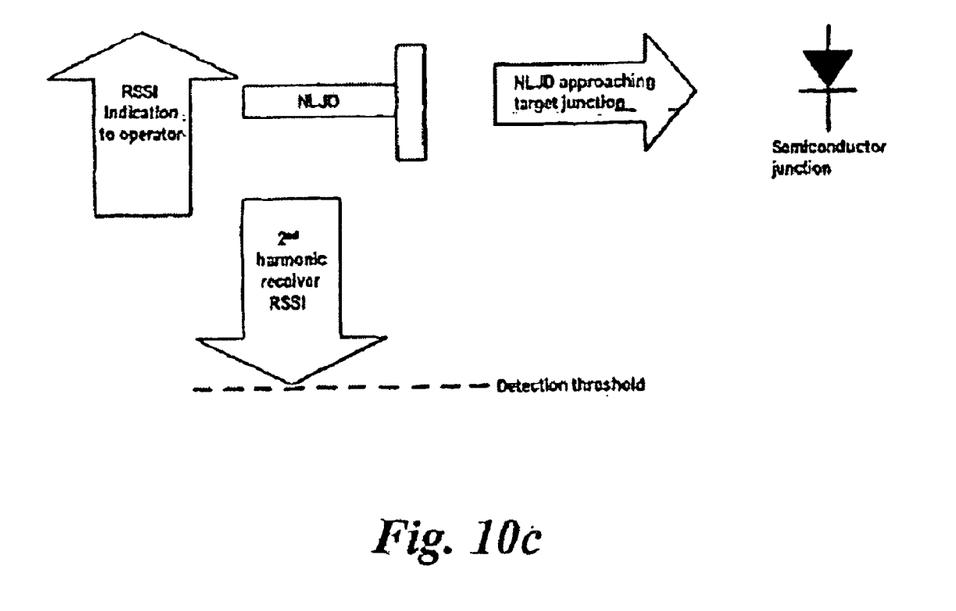

The general method for the case where the NLJD is approaching a target junction is illustrated in FIGS. 10a, b & c.

Case 2: NLJD Receding from a Target Junction

With further reference to FIG. 6, the following description of the algorithm operation relates to the NLJD moving away from a target non-linear junction.

When the RSSI from the 2nd harmonic receiver drops below the MAX_INPUT_RSSI level (ie. the test NEWPDIF>0 is not true, step 603), the software algorithm will increase the illuminating signal level, via the TXPOTN variable discussed later, to drive the RSSI back to the MAX_INPUT_RSSI level.

NEWPDIF is converted to a positive value (step 620) and the amount of increase in the illuminating signal level, NEWPDIF, is determined by checking to see whether the value NEWPDIF exceeds a maximum allowed step size or not (step 621). If yes, the algorithm calculates NEWPDIF to be OLDPDIF−MAXSTEP (step 622) and if no, OLDPDIF−NEWPDIF (step 623). If the recalculated NEWPDIF proves to be a negative number (step 624), the value is set to zero (step 625) and no change in power level occurs. The calculated value for NEWPDIF is then used to determine the power level of the illuminating signal, which is fed into the CALCULATE OUTPUT POWER algorithm of FIG. 8.

The illuminating signal level can be increased until the MAXPOWER level is reached.

As the illuminating signal level rises, the amount of increase, OLDPDIF, is subtracted from the RSSI indication (step 607).

This indicates to the operator that the NLJD is receding from a target junction.

Figure 11A:
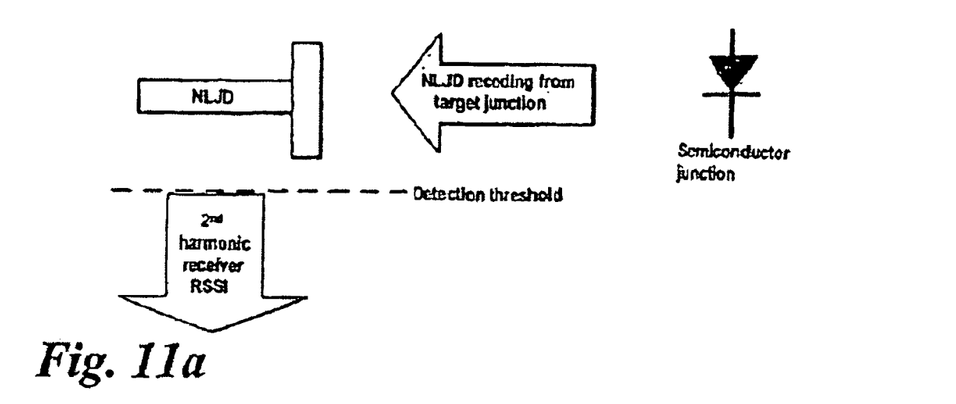
FIGS. 11a, 11b and 11c are schematic diagrams illustrating the principle of the invention for the case where a detector is moving away from a target junction.
Figure 11B:
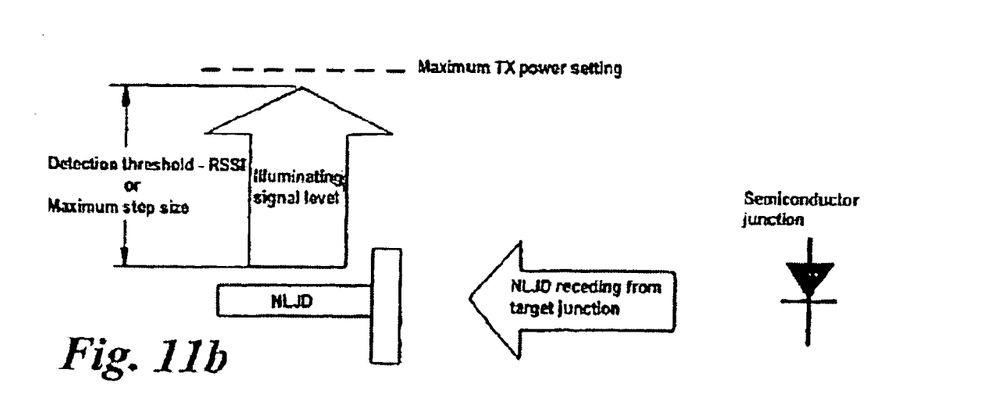
Figure 11C:
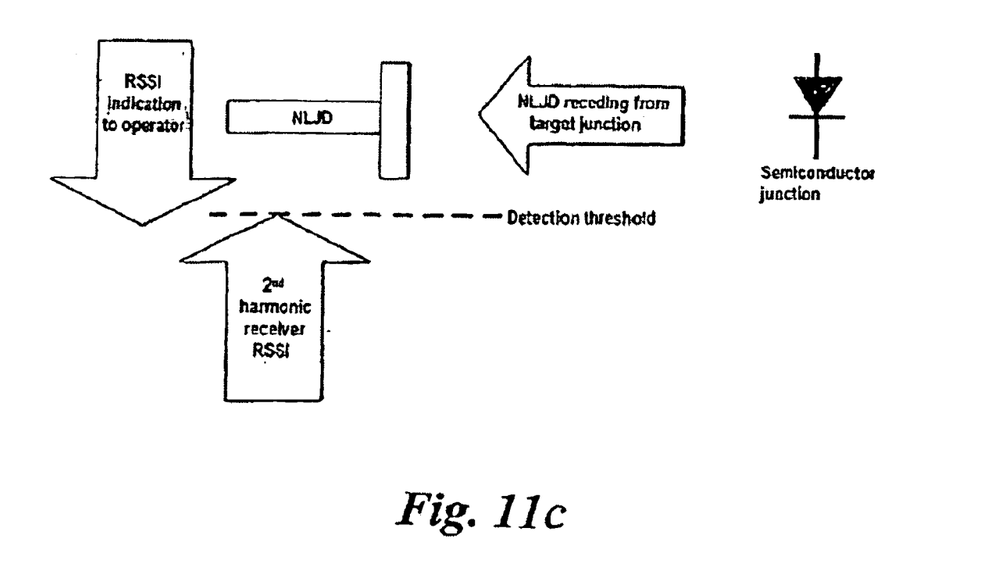

This is illustrated in FIGS. 11a, b & c.

The algorithm of FIG. 6 repeats for successive cycles, with OLDPDIF being defined as the value of NEWPDIF for a preceding pass through the algorithm.

With reference to FIG. 8, the CALCULATE OUTPUT POWER algorithm will now be described.

Initial conditions are set in step 801, where the transmit power TXPOTN is set to the target (maximum) power, MAXPOWER and the NUDGE factor is set to zero. For successive calculations of NEWPDIF from steps 605, 606, 622, 623 or 625, the transmit power TXPOTN is adjusted (step 802). If the adjusted value for TXPOTN should fall below the allowable minimum MINPOWER (step 803), then the OLDPDIF variable value is updated to the NEWPDIF value, and the NEWPDIF variable is reset to TXPOTN−MINPOWER; and TXPOTN is set to MINPOWER (step 804).

This would cause an error in the indicated RSSI to the user, but for the fact that the NUDGE factor is set to (OLDPDIF−NEWPDIF)*C, where C is a constant dependent upon the output power transfer characteristic of the NLJD, so that the calculation of indicated RSSI for display (step 607) is adjusted to take into account the NUDGE factor. In a preferred embodiment, C=4.

The calculated output power TXPOTN is used to drive the NLJD transmitter (step 805), and the algorithm returns to step 802.

In the preferred embodiment, the continuous wave power level of the second harmonic component in the received signal is selected as the input for the control means to maintain the RSSI at a constant level. However, it will be understood that other control parameters could be used. For example, the third harmonic could alternatively be selected, or a number of different harmonic components. Generally, a power level in a predetermined part of the spectrum (eg. a difference between the signal levels of the second and third harmonic components) could be used. Alternatively, signal amplitudes might be used instead of power levels.

The expression "signal strength" is intended to encompass the intensity or power level of the received signals, or appropriate spectral part thereof.

Although the preferred embodiment uses a stepwise control of the power output level of the transmitter, the output level could alternatively be varied in another manner, eg. a continuously varying feedback loop.

In the preferred embodiment, the detector is adapted to vary the power output level of the transmitter so as to drive the signal strength of the received signals towards a predetermined value, this may include maintaining the signal strength between two predetermined limits.

What is claimed is:

1. A non-linear junction detector comprising:
   a transmitter for emitting an illuminating signal at a power output level;
   a receiver for receiving reflected signals;
   means for determining a signal strength of said received signals;
   control means for automatically varying the power output level of the transmitter so as to drive the signal strength of said received signals towards a predetermined value; and
   means for providing to an operator an indication of a current received signal strength adjusted by a factor so as to compensate for any adaptation in the actual transmitted power output level made by said control means.

2. The non-linear junction detector of claim 1 in which the predetermined value is set to approximately a minimum detection threshold of the receiver.

3. The non-linear junction detector of claim 1 in which the means for determining a signal strength of said received signals comprises means for determining the signal strength of the received signal at a frequency that corresponds to a second harmonic of the illuminating signal frequency.

4. The non-linear junction detector of claim 1 in which the means for determining a signal strength of said received signals comprises means for determining the signal strength of the received signal at a frequency that corresponds to a third harmonic of the illuminating signal frequency.

5. The non-linear junction detector of claim 1 in which the means for determining a signal strength of said received signals includes means for determining the differential signal strength between two harmonic components of the received signal.

6. The non-linear junction detector of claim 1 in which the control means is adapted to automatically drive the signal strength of said received signals towards said predetermined value by stepwise adjustments in the transmitter power output level.

7. The non-linear junction detector of claim 1 in which said control means further includes means for limiting variation of said power output level between a predetermined maximum threshold value and a predetermined minimum threshold value.

8. The non-linear junction detector of claim 1 further including display means for displaying the indication to the operator.

9. The non-linear junction detector of claim 1 in which the control means is adapted to varying the power output level of the transmitter so as to maintain the signal strength of said received signals between a pair of predetermined control levels.

10. The non-linear junction detector of claim 1, further comprising:
    feedback means, coupled to said control means and said signal strength determining means, adapted to use the determined signal strength of said received signals as a control parameter for said transmitter control means.

11. A method of detecting non-linear junctions, comprising:
    transmitting an illuminating signal at a first power output level;
    receiving reflected signals from a non-linear junction;
    determining a signal strength of a selected component of said received signals;
    automatically varying the first power output level to a second power output level so as to drive the signal strength of said selected component towards a predetermined value; and
    providing to an operator an indication of a current received signal strength adjusted by a factor so as to compensate for any adaptation in the actual transmitted power output level.

12. A non-linear junction detector comprising:
    a transmitter for emitting an illuminating signal at a power output level;
    a receiver for receiving reflected signals and determining a signal strength of said received signals; and
    an output for providing a representation of the received signal strength to an operator, wherein the transmitter automatically varies the power output level so as to drive the signal strength of said received signals towards a predetermined value, and wherein the output provides an indication of a current received signal strength adjusted by a factor so as to compensate for any adaptation in the actual transmitted power output level made by the transmitter.

13. The non-linear junction detector of claim 12, wherein the transmitter automatically varies the power output level so as to maintain the signal strength of the received signals substantially at the predetermined value.

14. The non-linear junction detector of claim 13, wherein the predetermined value is set to approximately a minimum detection threshold of the receiver.

15. The non-linear junction detector of claim 12, wherein the transmitter automatically varies the power output level so as to maintain the signal strength of the received signals substantially within a predetermined range.

16. The non-linear junction detector of claim 12, wherein the factor has an inverse relationship with the magnitude of the transmit power level adjustment.

17. The non-linear junction detector of claim 12, wherein the receiver determines the signal strength of the received signals at a frequency that corresponds to at least one of a second harmonic of the illuminating signal frequency and a third harmonic of the illuminating signal frequency.

18. The non-linear junction detector of claim 12, wherein the transmitter automatically varies the power output level in stepwise adjustments.

\* \* \* \* \*